(12) United States Patent
Fan

(10) Patent No.: US 12,151,910 B2
(45) Date of Patent: Nov. 26, 2024

(54) MULTIFUNCTIONAL APPARATUS AND METHOD OF AUTOMATIC PUNCHING, LAMINATING, TAPE-PREPARING AND CUTTING FOR TAILING ENDS OF COILED MATERIALS

(71) Applicant: JIANGSU KATOP AUTOMATION CO., LTD, Liyang (CN)

(72) Inventor: Zhenhua Fan, Liyang (CN)

(73) Assignee: JIANGSU KATOP AUTOMATION CO., LTD, Liyang (CN)

( * ) Notice: Subject to any disclaimer, the term of this patent is extended or adjusted under 35 U.S.C. 154(b) by 416 days.

(21) Appl. No.: 17/553,034

(22) Filed: Dec. 16, 2021

(65) Prior Publication Data
US 2022/0106143 A1 Apr. 7, 2022

Related U.S. Application Data

(63) Continuation of application No. PCT/CN2020/094406, filed on Jun. 4, 2020.

(30) Foreign Application Priority Data

Jun. 20, 2019 (CN) .......................... 201910536106.6

(51) Int. Cl.
*B65H 19/12* (2006.01)
*B32B 37/00* (2006.01)
(Continued)

(52) U.S. Cl.
CPC ......... *B65H 19/12* (2013.01); *B32B 37/0046* (2013.01); *B32B 37/12* (2013.01);
(Continued)

(58) Field of Classification Search
CPC ...... B65H 19/10; B65H 19/102; B65H 19/12; B65H 19/1857; B65H 19/1878;
(Continued)

(56) References Cited

U.S. PATENT DOCUMENTS 3,010,672 A * 11/1961 Cecil, Jr. ................. B21C 47/34
242/561
4,108,391 A * 8/1978 Martinez ................. B65H 19/14
242/556.1
(Continued)

FOREIGN PATENT DOCUMENTS

CN 1153503 A * 7/1997 ........... B65H 19/102
CN 210339756 U * 4/2020 ............. B65H 19/29
(Continued)

*Primary Examiner* — Michael R Mansen
*Assistant Examiner* — Raveen J Dias
(74) *Attorney, Agent, or Firm* — WPAT. P.C.

(57) ABSTRACT

A multifunctional apparatus of automatic punching, laminating, tape-preparing and cutting for a tailing end of a coiled material and a method associated therewith are provided. The apparatus is provided with a winding device and the coiled material. The coiled material is wound on a rotating shaft of the winding device. A robotic arm is disposed above the winding device. One end of the robotic arm is mounted with a punching, tape-preparing and cutting mechanism, and the other end thereof is rotatably connected to a centering and deviating-correcting mechanism fixed on a winding diameter tracking mechanism. The robotic arm is driven by a motor or a pneumatic cylinder or a hydraulic cylinder. The winding diameter tracking mechanism is slidably disposed on a rail of a rack. The apparatus and method can improve efficiencies of winding and jointing of coiled materials, and reduce production cost.

5 Claims, 3 Drawing Sheets

(51) Int. Cl.
*B32B 37/12* (2006.01)
*B32B 38/00* (2006.01)
*B32B 38/04* (2006.01)
*B32B 38/10* (2006.01)
*B32B 38/18* (2006.01)
*B65H 19/10* (2006.01)
*B65H 19/29* (2006.01)
*B65H 35/00* (2006.01)

(52) U.S. Cl.
CPC .......... *B32B 38/0004* (2013.01); *B32B 38/04* (2013.01); *B32B 38/10* (2013.01); *B32B 38/18* (2013.01); *B32B 38/1825* (2013.01); *B65H 19/102* (2013.01); *B65H 19/29* (2013.01); *B65H 35/0086* (2013.01); *B32B 2038/042* (2013.01); *B32B 2038/045* (2013.01); *B32B 2038/1891* (2013.01); *B32B 2309/70* (2013.01); *B65H 2301/414422* (2013.01); *B65H 2301/51512* (2013.01)

(58) Field of Classification Search
CPC ............ B65H 19/1863; B65H 19/1868; B65H 19/1873; B65H 19/22; B65H 19/29; B65H 19/30; B65H 19/2215; B65H 19/2269; B65H 19/2292; B65H 19/20; B65H 19/265; B65H 35/00; B65H 35/0006; B65H 35/0033; B65H 35/008; B65H 35/0086; B65H 35/04; B65H 35/06; B65H 35/08; B65H 75/28; B65H 2301/41427; B65H 2301/414422; B65H 2301/41764; B65H 2301/41766; B65H 2301/51535; B65H 2301/46066; B65H 2301/4607; B65H 2301/4631; B65H 26/08; B65H 9/265; B32B 38/00; B32B 38/0004; B32B 38/04; B32B 38/18; B32B 38/1808; B32B 38/1891; B32B 38/185; B32B 38/1825; B32B 2038/042; B32B 2038/045; B32B 38/10; B32B 2309/70; B32B 37/12; B32B 37/0046; Y10T 156/12; Y10T 156/1304; Y10T 156/1309; Y10T 156/1313; Y10T 156/1318; Y10T 156/1357; Y10T 156/1361
See application file for complete search history.

(56) References Cited

U.S. PATENT DOCUMENTS

| | | | | |
|---|---|---|---|---|
| 4,284,463 A * | 8/1981 | Wright | B65H 19/18 | 83/508 |
| 4,291,460 A * | 9/1981 | Stoehr | B65H 19/29 | 53/118 |
| 4,575,017 A * | 3/1986 | Pali | B65H 19/102 | 242/555.3 |
| 4,802,632 A * | 2/1989 | Fukuda | B65H 19/105 | 242/532.5 |
| 4,984,750 A * | 1/1991 | Shigeta | B65H 19/29 | 242/562.1 |
| 5,211,799 A * | 5/1993 | Madrzak | B65H 19/102 | 156/518 |
| 5,322,230 A * | 6/1994 | Dylla | B65H 19/102 | 156/504 |
| 5,513,478 A * | 5/1996 | Abt | B65H 19/2276 | 53/118 |
| 5,524,844 A * | 6/1996 | McCormick | B65H 19/102 | 242/910 |
| 5,637,174 A * | 6/1997 | Field | B32B 37/1027 | 283/109 |
| 5,643,398 A * | 7/1997 | Lumberg | B65H 19/29 | 156/449 |
| 5,792,308 A * | 8/1998 | Ryan | B26D 5/16 | 156/543 |
| 5,935,361 A * | 8/1999 | Takahashi | B65H 19/102 | 156/507 |
| 6,013,148 A * | 1/2000 | Bluemle | B65H 19/1873 | 156/507 |
| 6,273,168 B1 * | 8/2001 | Kawamura | B65H 19/29 | 156/522 |
| 6,565,034 B1 * | 5/2003 | Hesse | B65H 19/1847 | 242/556.1 |
| 6,808,581 B2 * | 10/2004 | Kuta | B65H 19/105 | 242/555.3 |
| 7,322,542 B2 * | 1/2008 | Reinke | B65H 20/20 | 242/533.7 |
| 10,099,882 B2 * | 10/2018 | Lindberg | B65H 19/29 | |
| 10,252,484 B2 * | 4/2019 | Winkens | B65H 18/08 | |
| 11,084,241 B2 * | 8/2021 | Winkens | B31D 5/0047 | |
| 11,577,483 B2 * | 2/2023 | Winkens | B31D 5/0069 | |
| 11,858,768 B2 * | 1/2024 | Lucia | B65H 19/102 | |
| 2002/0189746 A1 * | 12/2002 | Kuta | B65H 19/102 | 156/502 |
| 2003/0116256 A1 * | 6/2003 | Erickson | B65H 19/105 | 156/504 |
| 2006/0162852 A1 * | 7/2006 | Gertsch | B65H 19/102 | 156/267 |
| 2006/0255202 A1 * | 11/2006 | Reinke | B65H 19/29 | 242/532 |
| 2011/0265954 A1 * | 11/2011 | Gelli | B65H 19/29 | 156/459 |
| 2016/0001519 A1 * | 1/2016 | Winkens | B65H 18/08 | 156/361 |
| 2016/0107859 A1 * | 4/2016 | Lindberg | B65H 19/29 | 156/443 |
| 2017/0137248 A1 * | 5/2017 | Sato | B65H 19/102 | |
| 2017/0341894 A1 * | 11/2017 | Muller | B65H 19/107 | |
| 2019/0176432 A1 * | 6/2019 | Winkens | B65H 19/30 | |
| 2020/0254711 A1 * | 8/2020 | Ruhland | B31F 1/2863 | |
| 2021/0331438 A1 * | 10/2021 | Winkens | B31D 5/0047 | |
| 2022/0119214 A1 * | 4/2022 | Lucia | B65H 19/102 | |
| 2022/0152970 A9 * | 5/2022 | Winkens | B31D 5/0047 | |
| 2023/0008543 A1 * | 1/2023 | Torres Martinez | B25J 13/08 | |
| 2023/0352718 A1 * | 11/2023 | Fan | H01M 10/052 | |
| 2024/0002096 A1 * | 1/2024 | Salminen | B65H 19/2215 | |

FOREIGN PATENT DOCUMENTS

| | | | | |
|---|---|---|---|---|
| EP | 0374872 A2 * | 6/1990 | ............ | B65H 19/29 |
| JP | 10120261 A * | 5/1998 | ............ | B65H 19/29 |

* cited by examiner

MULTIFUNCTIONAL APPARATUS AND METHOD OF AUTOMATIC PUNCHING, LAMINATING, TAPE-PREPARING AND CUTTING FOR TAILING ENDS OF COILED MATERIALS

TECHNICAL FIELD

The invention relates to the multifunctional automatic jointing and tape-preparing equipment, and more particularly to a multifunctional apparatus integrated with multiple functions of automatic punching, laminating, tape-preparing and cutting for tailing ends of coiled materials and a method of automatic punching, laminating, tape-preparing and cutting for tailing ends of coiled materials.

DESCRIPTION OF RELATED ART

With the increasing of automation in modern factories, various kinds of equipment are becoming unmanned and intelligent. After a winding operation of a traditional coating machine, it is necessary to manually attach a tape to laminate a tailing end of a coiled material, and manually laminates a double-sided tape to prepare for a subsequent automatic jointing. The above two manual processes have poor alignment of tape laminating, low efficiency, high shutdown rate and more wastes, and thus it cannot meet the needs of automatic high-speed production.

SUMMARY

An objective of the invention is to overcome the deficiencies in the prior art, and provide a multifunctional apparatus of automatic punching, laminating, tape-preparing and cutting for a tailing end of a coiled material, which can realize automatic punching and laminating for the tailing end of the coiled material and prepare a double-sided tape for subsequent automatic jointing.

Technical solutions proposed by the invention are as follows.

In one aspect, an application method of a multifunctional apparatus of automatic punching, laminating, tape-preparing and cutting for tailing ends of coiled materials may include the following steps:
material loading, including: driving a punching, tape-preparing and cutting mechanism to rotate for ascending by a robotic arm to form a receiving space, and supporting and loading the coiled material onto a winding device by a loading and unloading trolley;
tracking and distance-adjustment, including: driving the punching, tape-preparing and cutting mechanism to rotate for descending by the robotic arm, and adjusting front and rear distances of the robotic arm by a robotic arm winding diameter tracking mechanism;
centering and deviation-correction, including: adjusting the robotic arm to an optimal position for punching and tape-laminating according to an edge position of the coiled material by a robotic arm centering and deviation-correcting mechanism;
unwinding, including: after the robotic arm and the punching, tape-preparing and cutting mechanism are ready at respective working positions, unwinding the coiled material and thereby a sheet material unwound from the coiled material entering the punching, tape-preparing and cutting mechanism along a guiding plate under the aid of an air-blowing guide assembly;
punching, including: pressing the sheet material by a pressing assembly triggered by a signal issued from a sensor or a photoelectric switch when senses the sheet material completely enters the punching, tape-preparing and cutting mechanism, to form a flat area, and punching the flat area to form a punched hole by a punching assembly;
tape-laminating, including: conveying the sheet material again a predetermined length to deliver the punched hole to below a tape-laminating and cutting assembly, pressing the sheet material and a head of a tape together by a pressing-head assembly, and driving the tape-laminating and cutting assembly by a linear drive assembly to laminate the tape;
cutting, including: cutting excess material by a cutter after the tape-laminating and cutting assembly returns back, and the cut excess material (i.e., waste) automatically dropping/falling into a waste collection assembly;
material unloading, including: driving the punching, tape-preparing and cutting mechanism to rotate for ascending by the robotic arm to form a receiving space, and supporting and unloading the coiled material from the winding device by the loading and unloading trolley; and, repeatedly carrying out the above steps.

In another aspect, a multifunctional apparatus of automatic punching, laminating, tape-preparing and cutting for a tailing end of a coiled material may include: a robotic arm, and a punching, tape-preparing and cutting mechanism. An end of the robotic arm is mounted with the punching, tape-preparing and cutting mechanism, and another end of the robotic arm is rotatably connected to a rack; and the robotic arm is driven to rotate by a motor or a pneumatic cylinder or a hydraulic cylinder.

In an embodiment, the punching, tape-preparing and cutting mechanism includes a punching assembly, a pressing assembly, a tape-laminating and cutting assembly, a linear drive assembly, and a pressing-head assembly. The punching assembly and the pressing assembly are respectively secured on an upper side and a lower side of a reference plate of tape-preparing mechanism, the tape-laminating and cutting assembly is disposed at a side of a sheet material unwound from the coiled material and drivingly connected to the linear drive assembly. The pressing-head assembly is arranged corresponding to the sheet material and a head of a tape.

In an embodiment, the multifunctional apparatus further includes a robotic arm winding diameter tracking mechanism. The robotic arm winding diameter tracking mechanism is slidably disposed on a rail of the rack and connected to the another end of the robotic arm.

In an embodiment, a robotic arm centering and deviation-correcting mechanism is secured on the robotic arm winding diameter tracking mechanism, and the another end of the robotic arm is rotatably connected to the robotic arm centering and deviation-correcting mechanism.

In an embodiment, the punching, tape-preparing and cutting mechanism is mounted with a guiding plate at a side of an inlet of the sheet material.

In an embodiment, the punching, tape-preparing and cutting mechanism is mounted with an air-blowing guide assembly at another opposite side of the inlet of the sheet material, an air inlet of the air-blowing guide assembly is configured (i.e., structured and arranged) to input a compressed gas, and an air outlet of the air-blowing guide assembly is arranged facing towards the inlet of the sheet material.

In an embodiment, a waste collection assembly is disposed below the tape-laminating and cutting assembly, and the waste collection assembly includes a waste container.

In summary, by adopting the above technical solutions, the invention may have beneficial effects as follows:

(1) the invention may achieve automatic identification of winding diameter and have good alignment and consistency for tape-laminating and double-sided tape preparing, and may realize the functions of automatic cutting and waste collection, which can reduce the probability of material breakage and wrinkles, produce less waste, improve efficiencies of winding and jointing of coiled material, and reduce production cost.

(2) the invention can realize an overall unmanned operation of winding and jointing, adapt to materials of different winding diameters, and automatically adjust front and rear positions of the punching, tape-preparing and cutting mechanism according to the different winding diameters.

(3) the centering and deviation-correcting mechanism of the invention can adapt to the adjustment of edge positions of materials with different specifications, thereby improving the positioning precision and strictly controlling a punching margin and a spacing between head and tail of tape.

(4) the invention may adopt a combination of rigid guiding and flexible guiding, and control to enable a function or circulating action at different times by a program, which can improve the reliability of the sheet material being guided into mechanism for punching.

(5) the invention can realize two functions in one time of material feeding, and thus can avoid multiple times of positioning of product.

(6) the mechanism for cutting of the invention may be equipped with the waste container therebelow, which can ensure the environment cleaning of workshop site, and it may adopt pre-cutting and post-cutting according to functional requirements, multiple times of cutting can cut a large-area waste material into small pieces of sheet materials, so that the size of waste material is reduced. Moreover, the cut waste material would be automatically collected, and it can realize a docking with a large-sized waste collection device per day or per shift.

BRIEF DESCRIPTION OF DRAWINGS

In order to make the content of the invention easier to be clearly understood, the invention will be further described in detail below according to exemplary embodiments with reference to accompanying drawings, in which.

Figure 1:
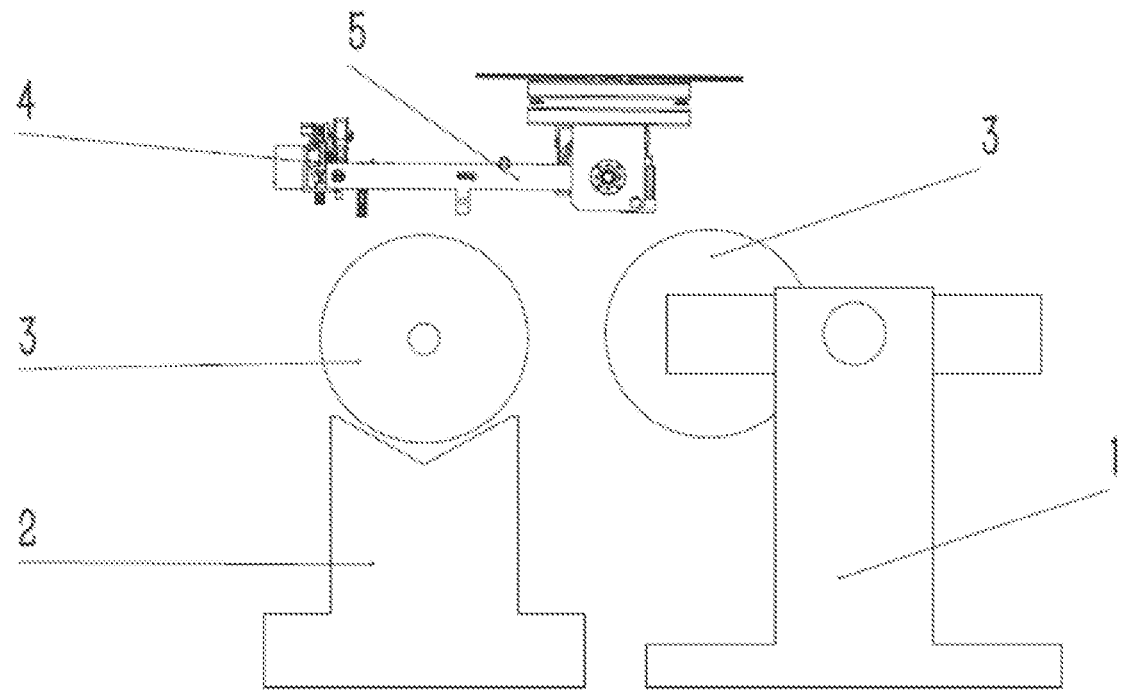
FIG. 1 is a schematic view showing a state of forming a receiving space associated with a multifunctional punching, tape-preparing and cutting mechanism and a robotic arm when loading and unloading.

Description of numeral references in the drawings: 1, winding device; 2, loading and unloading trolley; 3, coiled material; 4, punching, tape-preparing and cutting mechanism; 5, robotic arm; 6, robotic arm centering and deviation-correcting mechanism; 7, robotic arm winding diameter tracking mechanism; 10, sheet material; 20, reference plate of tape-preparing mechanism; 21, guiding plate; 22, air-blowing guide assembly; 23, punching assembly; 24, pressing assembly; 25, tape-laminating and cutting assembly; 26, linear drive assembly; 27, waste collection assembly; 28, pressing-head assembly.

DETAILED DESCRIPTION OF EMBODIMENTS

Figure 2:
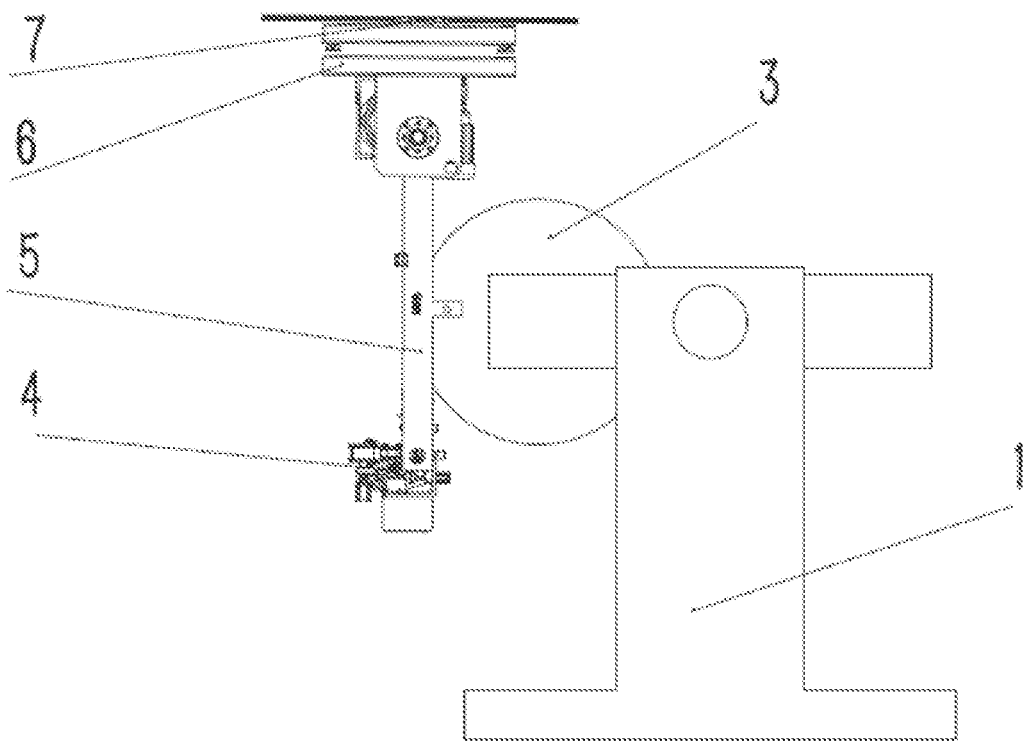
FIG. 2 is a schematic view showing a working position of the multifunctional punching, tape-preparing and cutting mechanism.
Figure 3:
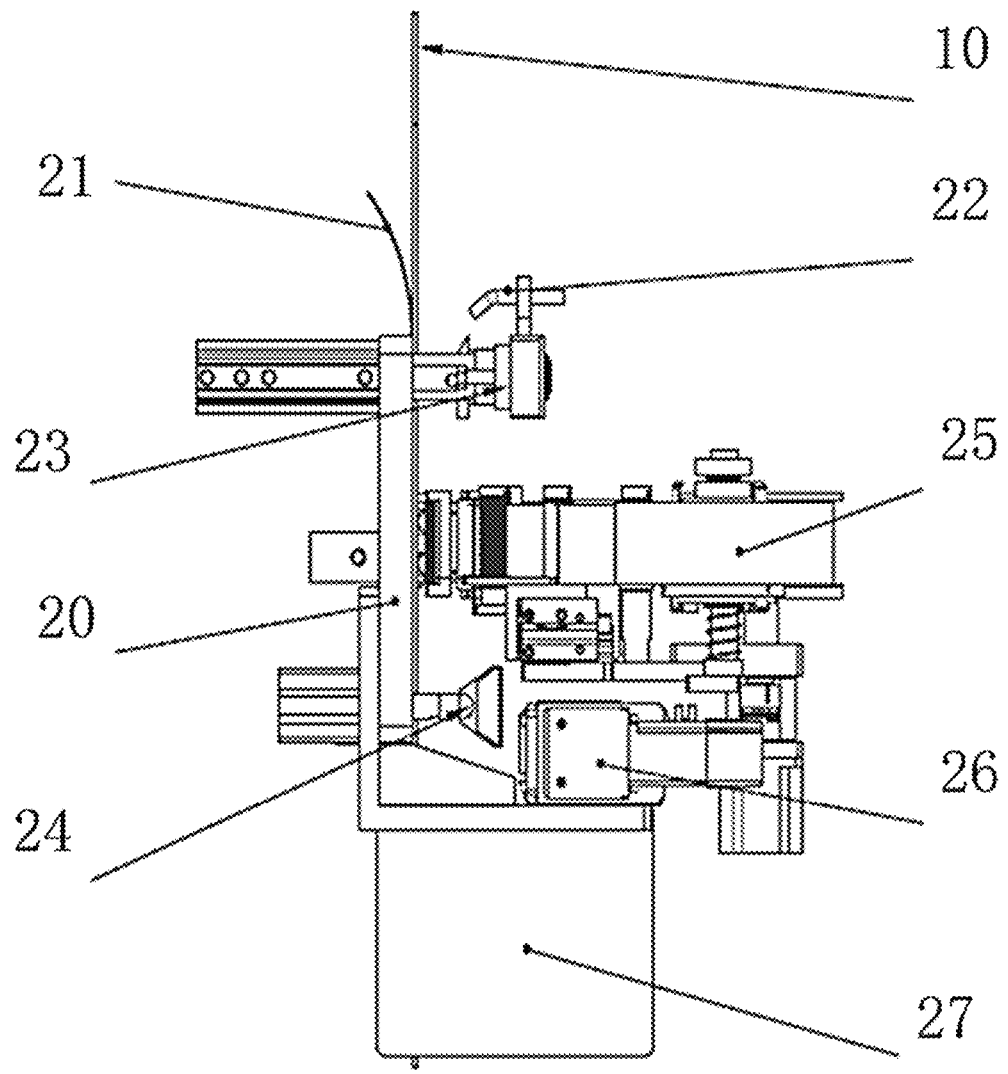
FIG. 3 is a schematic side view of the multifunctional punching, tape-preparing and cutting mechanism.
Figure 4:
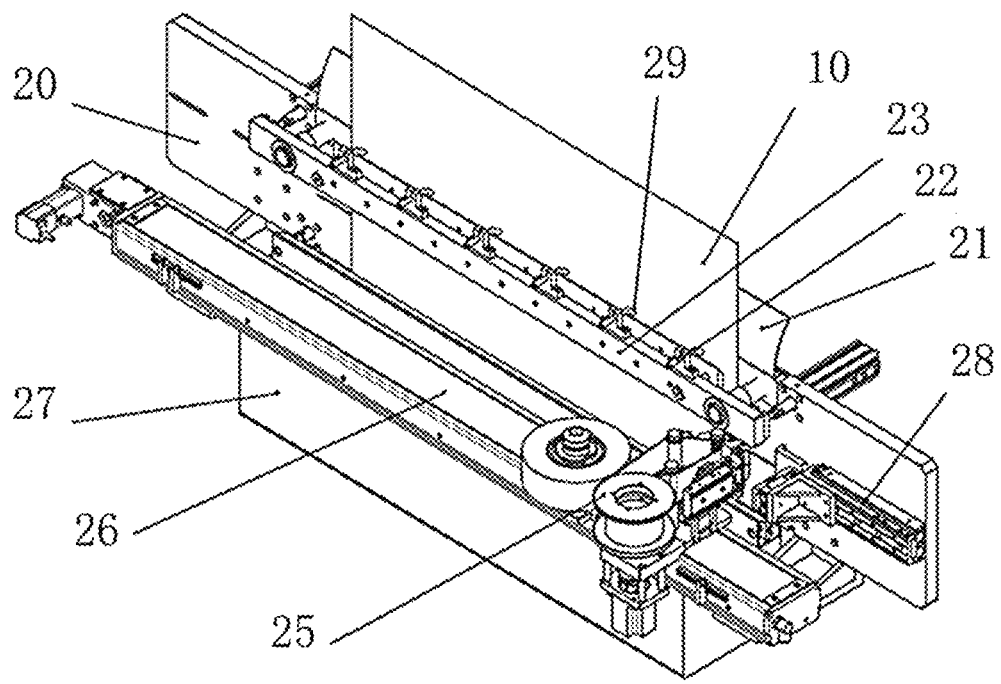
FIG. 4 is a schematic enlarged isometric view of the multifunctional punching, tape-preparing and cutting mechanism.

Referring to FIG. 1 through FIG. 4, an embodiment of the invention includes a winding device 1, a loading and unloading trolley 2, and a coiled material 3. The loading and unloading trolley 2 is configured (i.e., structured and arranged) to support and load the coiled material 3 onto the winding device 1, and thereby the coiled material 3 is wound on a rotating shaft of the winding device 1. A robotic arm 5 is disposed above the winding device 1. One end of the robotic arm 5 is mounted with a punching, tape-preparing and cutting mechanism 4, and the other end of the robotic arm 5 is rotatably connected to a robotic arm centering and deviation-correcting mechanism 6 fixed onto a robotic arm winding diameter tracking mechanism 7. The robotic arm 5 is driven to rotate by a motor or a pneumatic cylinder or a hydraulic cylinder. The robotic arm winding diameter tracking mechanism 7 is slidably disposed on a rail of a rack.

The punching, tape-preparing and cutting mechanism 4 includes a punching assembly 23, a pressing assembly 24, a tape-laminating and cutting assembly 25, a linear drive assembly 26, and a pressing-head assembly 28. The punching assembly 23 and the pressing assembly 24 are respectively mounted on upper and lower sides of a reference plate of tape-preparing mechanism 20. The tape-laminating and cutting assembly 25 is disposed at a side of a sheet material 10 unwound from the coiled material 3, and drivingly coupled to the linear drive assembly 26. The pressing-head assembly 28 is arranged corresponding to both the sheet material 10 and a head of a tape.

The punching, tape-preparing and cutting mechanism 4 is mounted with a guiding plate 21 at a side of an inlet of the sheet material 10, and the punching, tape-preparing and cutting mechanism 4 is further mounted with an air-blowing guide assembly 22 at the other opposite side of the inlet of the sheet material 10. The air-blowing guide assembly 22 is connected to a fan, and air outlets of the air-blowing guide assembly 22 are arranged facing towards the sheet material 10. A location in which the pressing assembly 24 is located is equipped with a sensor or a photoelectric switch. A waste collection assembly 27 is disposed below the tape-laminating and cutting assembly 25, and the waste collection assembly 27 includes a waste container.

A working principle of the embodiment of the invention is as follows:

when loading and unloading of coiled material, the robotic arm 5 drives the punching, tape-preparing and cutting mechanism 4 to ascend to thereby form a receiving space (also referred to as avoidance space). Moreover, the loading and unloading trolley 2 supports and loads the coiled material 3 onto the winding device 1 when loading of coiled material.

When a tape is required to be attached/laminated after winding, the robotic arm 5 drives the punching, tape-preparing and cutting mechanism 4 to descend, the robotic arm winding diameter tracking mechanism 7 has a built-in winding diameter detecting sensor, and a driving mechanism adjusts front and rear distances (also referred to as front and rear positions) of the robotic arm 5 according to a signal issued from the sensor. Moreover, the robotic arm centering and deviation-correcting mechanism 6, according to a sensor signal about edge positions of the coiled material, controls the driving mechanism to adjust the robotic arm 5 to an optimal position for punching and tape-laminating.

After the robotic arm 5 and the punching, tape-preparing and cutting mechanism 4 are ready at respective working positions, the coiled material 3 is unwound to form a partial sheet material 10. The sheet material 10 enters the punching, tape-preparing and cutting mechanism 4 along the guiding plate 21. The air-blowing guide assembly 22 assists the entire entering process of the sheet material 10, which can prevent wrinkles, curling, etc., and make the sheet material 10 enter the punching, tape-preparing and cutting mechanism 4 more smoothly.

After the sheet material 10 completely enters the punching, tape-preparing and cutting mechanism 4, the sensor will sense the state and issues a signal, the pressing assembly 24 then presses the sheet material 10 to form a flat area, and the punching assembly 23 punches the flat area to form a punched hole 29.

After the punching is completed, the sheet material 10 is again conveyed a preset length to deliver the punched hole 29 to underside of the tape-laminating and cutting assembly 25, the pressing-head assembly 28 presses the sheet material 10 and the head of the tape together, and the linear drive assembly 26 drives the tape-laminating and cutting component 25 to laminate the tape.

The tape-laminating and cutting assembly 25 is a multi-functional mechanism integrated with the functions of tape-laminating and cutting, which can complete two functions in one time of material feeding, thereby preventing multiple times of positioning of product.

After the tape is laminated onto the sheet material, excess material is cut by a cutter after the tape-laminating and cutting assembly 25 returns back, and the cut excess material (i.e., waste material) automatically falls into the waste collection assembly 27.

By the above described exemplary embodiments, the objectives, technical solutions and beneficial effects of the invention have been described in detail. It should be understood that the above description is merely exemplary embodiments of the invention and is not intended to limit the invention. Any modification, equivalent replacement, improvement, etc. made within the spirit and principle of the invention shall be included in the protection scope of the invention.

What is claimed is:

1. An application method of a multifunctional apparatus of automatic punching, laminating, tape-preparing and cutting for a tailing end of a coiled material, comprising:
    material loading, comprising: driving a punching, tape-preparing and cutting mechanism (4) to rotate for ascending by a robotic arm (5) to form a receiving space, and supporting and loading the coiled material (3) onto a winding device (1) by a loading and unloading trolley (2);
    tracking and distance-adjustment, comprising: driving the punching, tape-preparing and cutting mechanism (4) to rotate for descending by the robotic arm (5), and adjusting front and rear distances of the robotic arm (5) by a robotic arm winding diameter tracking mechanism (7);
    centering and deviation-correction, comprising: adjusting the robotic arm (5) to an optimal position for punching and tape-laminating according to an edge position of the coiled material (3) by a robotic arm centering and deviation-correcting mechanism (6);
    unwinding, comprising: after the robotic arm (5) and the punching, tape-preparing and cutting mechanism (4) are ready at respective working positions, unwinding the coiled material (3) and thereby a sheet material (10) unwound from the coiled material (3) entering the punching, tape-preparing and cutting mechanism (4) along a guiding plate (21) under the aid of an air-blowing guide assembly (22);
    punching, comprising: pressing the sheet material (10) by the punching, tape-preparing and cutting mechanism (4) in response to the sheet material (10) completely entering the punching, tape-preparing and cutting mechanism (4) to form a flat area, and punching the flat area to form a punched hole (29) by the punching, tape-preparing and cutting mechanism (4);
    tape-laminating, comprising: conveying the sheet material (10) again a preset length, then pressing the sheet material (10) and a head of a tape by the punching, tape-preparing and cutting mechanism (4), followed by laminating the tape;
    cutting, comprising: after laminating the tape, cutting excess material of the sheet material (10) by the punching, tape-preparing and cutting mechanism (4) and the cut excess material of the sheet material (10) automatically falling into a waste collection assembly (27); and
    material unloading, comprising: driving the punching, tape-preparing and cutting mechanism (4) to rotate for ascending by the robotic arm (5) to form a receiving space, and supporting and unloading the coiled material (3) from the winding device (1) by the loading and unloading trolley (2).

2. A multifunctional apparatus of automatic punching, laminating, tape-preparing and cutting for a tailing end of a coiled material, comprising: a winding device (1), a loading and unloading trolley (2), a robotic arm centering and deviation-correcting mechanism (6), a robotic arm winding diameter tracking mechanism (7), a guiding plate (21), an air-blowing guide assembly (22), a waste collection assembly (27), a robotic arm (5) and a punching, tape-preparing and cutting mechanism (4); wherein an end of the robotic arm (5) is mounted with the punching, tape-preparing and cutting mechanism (4), the other end of the robotic arm (5) is rotatably connected to the robotic arm centering and deviation-correcting mechanism (6), the robotic arm centering and deviation-correcting mechanism (6) is fixed onto the robotic arm winding diameter tracking mechanism (7), the robotic arm winding diameter tracking mechanism (7) is slidably connected to a rack, the guiding plate (21) is installed on the punching, tape-preparing and cutting mechanism (4), the waste collection assembly (27) is disposed below the punching, tape-preparing and cutting mechanism (4), the air-blowing guide assembly (22) is disposed above the punching, tape-preparing and cutting mechanism (4), and the multifunctional apparatus is configured to be used in the application method as claimed in claim 1.

3. The multifunctional apparatus as claimed in claim 2, wherein the guiding plate (21) is located at a side of an inlet of a sheet material (10).

4. The multifunctional apparatus as claimed in claim 3, wherein the punching, tape-preparing and cutting mechanism (4) is mounted with the air-blowing guide assembly (22) at another opposite side of the inlet of the sheet material (10), an air inlet of the air-blowing guide assembly (22) is configured to input a compressed gas, and an air outlet of the air-blowing guide assembly (22) is arranged facing towards the inlet of the sheet material (10).

5. The multifunctional apparatus as claimed in claim 4, wherein the waste collection assembly (27) comprises a waste container.

\* \* \* \* \*